US012669144B2

(12) United States Patent
Chen

(10) Patent No.: US 12,669,144 B2
(45) Date of Patent: Jun. 30, 2026

(54) THREADED FASTENER

(71) Applicant: Yu-Min Chen, Kaohsiung (TW)

(72) Inventor: Yu-Min Chen, Kaohsiung (TW)

( * ) Notice: Subject to any disclaimer, the term of this patent is extended or adjusted under 35 U.S.C. 154(b) by 430 days.

(21) Appl. No.: 18/385,359

(22) Filed: Oct. 30, 2023

(65) Prior Publication Data

US 2024/0068498 A1 Feb. 29, 2024

(51) Int. Cl.
*F16B 19/05* (2006.01)
*F16B 19/10* (2006.01)
*F16B 33/02* (2006.01)

(52) U.S. Cl.
CPC .............. *F16B 33/02* (2013.01); *F16B 19/05* (2013.01); *F16B 19/1045* (2013.01)

(58) Field of Classification Search
CPC ... F16B 19/1045; F16B 19/1054; F16B 19/05
USPC .............................................. 411/34, 38, 361
See application file for complete search history.

(56) References Cited

U.S. PATENT DOCUMENTS 3,107,572 A * 10/1963 Orloff ................. F16B 19/1063
                                                                    411/34
4,254,809 A * 3/1981 Schuster ................. F16B 19/05
                                                                    411/277

4,865,499 A * 9/1989 Lacey ..................... F16B 19/05
                                                                    411/361
4,969,785 A * 11/1990 Wright ................ F16B 19/1054
                                                                    411/34
4,990,042 A * 2/1991 Szayer .................. F16B 19/083
                                                                    470/11
5,061,132 A * 10/1991 Cosenza ............... F16B 39/026
                                                                    411/3
6,247,883 B1 * 6/2001 Monserratt ........... F16B 13/045
                                                                    411/69
6,659,699 B2 * 12/2003 Stoewer .................. F16B 19/05
                                                                    411/421
7,901,171 B2 * 3/2011 Schruff ................. F16B 37/067
                                                                    411/38
8,430,613 B2 * 4/2013 Ohkubo .............. F16B 19/1054
                                                                    411/360
10,081,049 B2 * 9/2018 Liu ........................... B21J 15/02
2024/0102504 A1 * 3/2024 Huang .................... F16B 33/02

* cited by examiner

*Primary Examiner* — Flemming Saether

(57) ABSTRACT

A fastener includes a bolt including a head and a threaded shank including a bare section proximate the head, an end section having a wider end and having a plurality of alternate grooves and ridges, an intermediate section proximate the end section and having a spiral trough, and a threaded section between the intermediate section and the bare section; and a hollow member including a head member and a malleable shank having a plurality of holes. The end section is tapered toward the intermediate section at an angle of 3-degree to 8-degree.

1 Claim, 14 Drawing Sheets

11'

THREADED FASTENER

BACKGROUND OF THE INVENTION

1. Field of the Invention

The invention relates to fasteners and more particularly to a threaded fastener having improved characteristics including an increased fastening force.

2. Description of Related Art

Referring to FIG. 1, a bolt 10' of a conventional threaded fastener is shown and referring to FIG. 2, an elongated, hollow member 11' of the conventional threaded fastener is shown. The bolt 10' comprises an enlarged head 100' and a threaded shank 101' having an intermediate bare section 102'.

However, the conventional threaded fastener is disadvantageous because the fastening force exerted on a work piece by the threaded fastener is not sufficient. It is typical that the work piece may be loosened.

Thus, the need for improvement still exists.

SUMMARY OF THE INVENTION

It is therefore one object of the invention to provide a fastener comprising a bolt including a head and a threaded shank including a bare section proximate the head, an end section having a wider end and having a plurality of alternate grooves and ridges, an intermediate section proximate the end section and having a spiral trough, and a threaded section between the intermediate section and the bare section; and a hollow member including a head member and a malleable shank having a plurality of holes.

The invention has the following advantages and benefits in comparison with the conventional art: a fastening force is increased. The manufacturing cost is decreased. Length of the bolt is decreased. A variety of work pieces having different thickness can be fastened.

The above and other objects, features and advantages of the invention will become apparent from the following detailed description taken with the accompanying drawings.

DETAILED DESCRIPTION OF THE INVENTION

Figure 1:
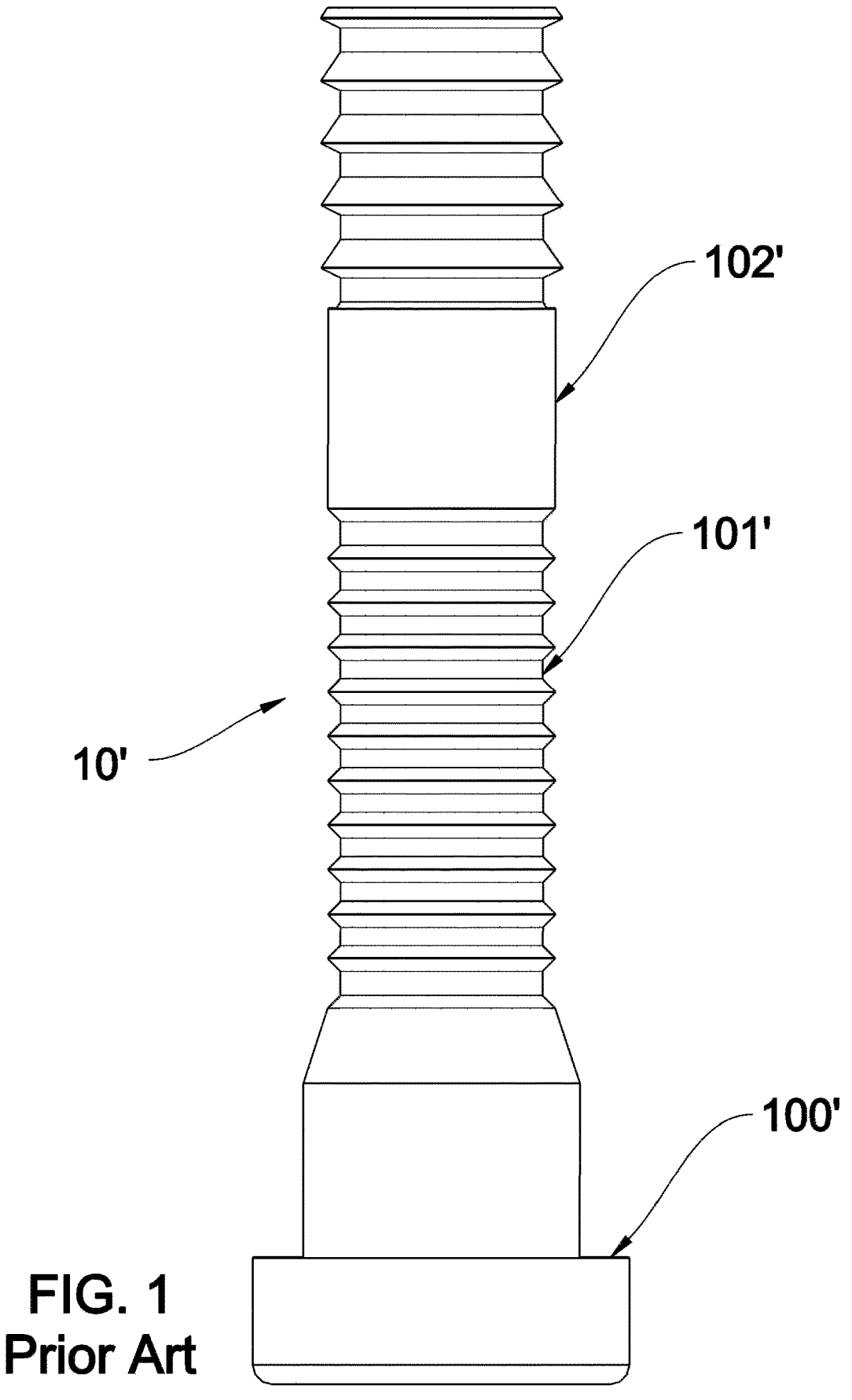
FIG. 1 is a side elevation of a bolt of a conventional threaded fastener.
Figure 2:
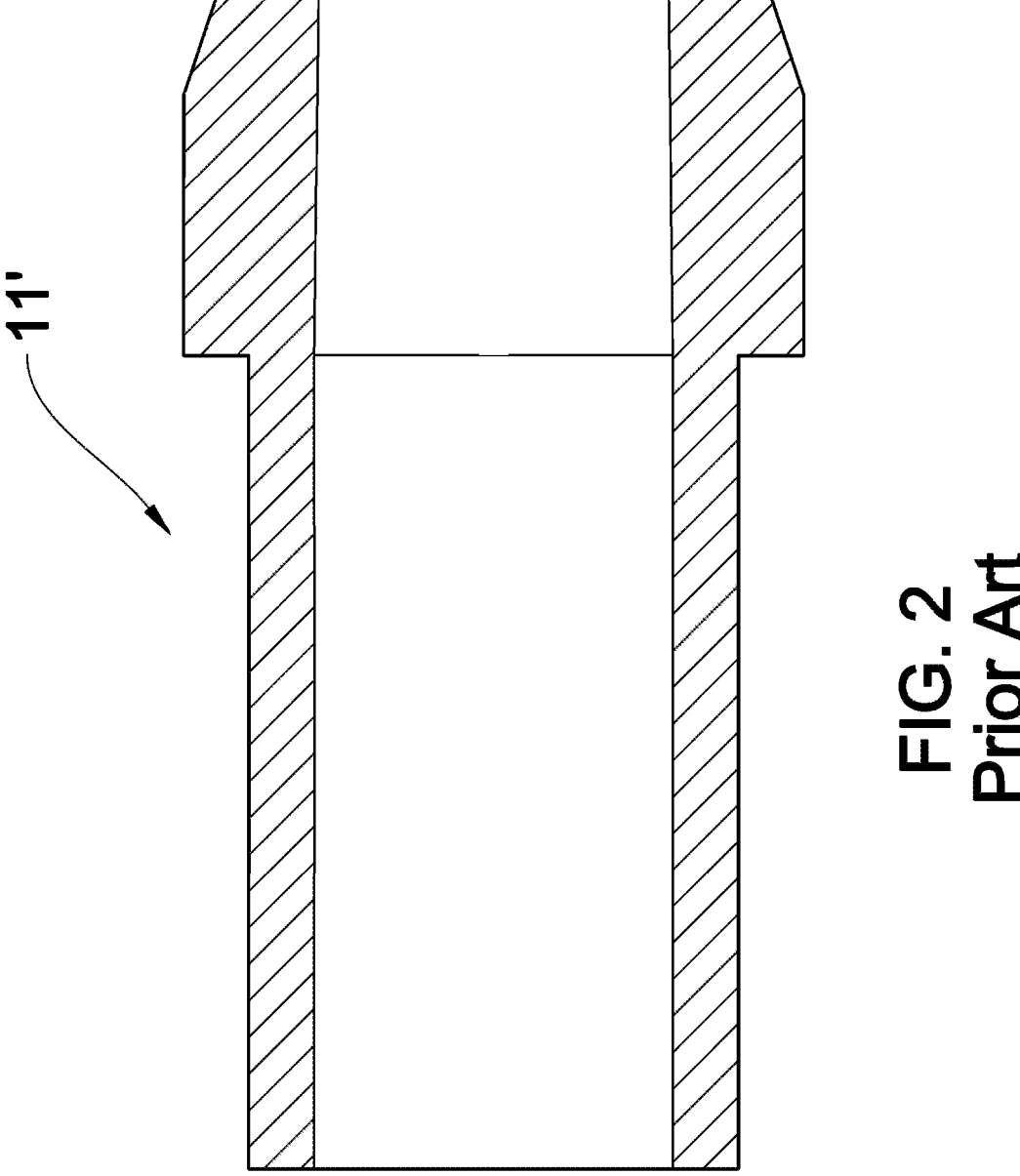
FIG. 2 is a sectional view of a hollow member of the conventional threaded fastener.
Figure 3:
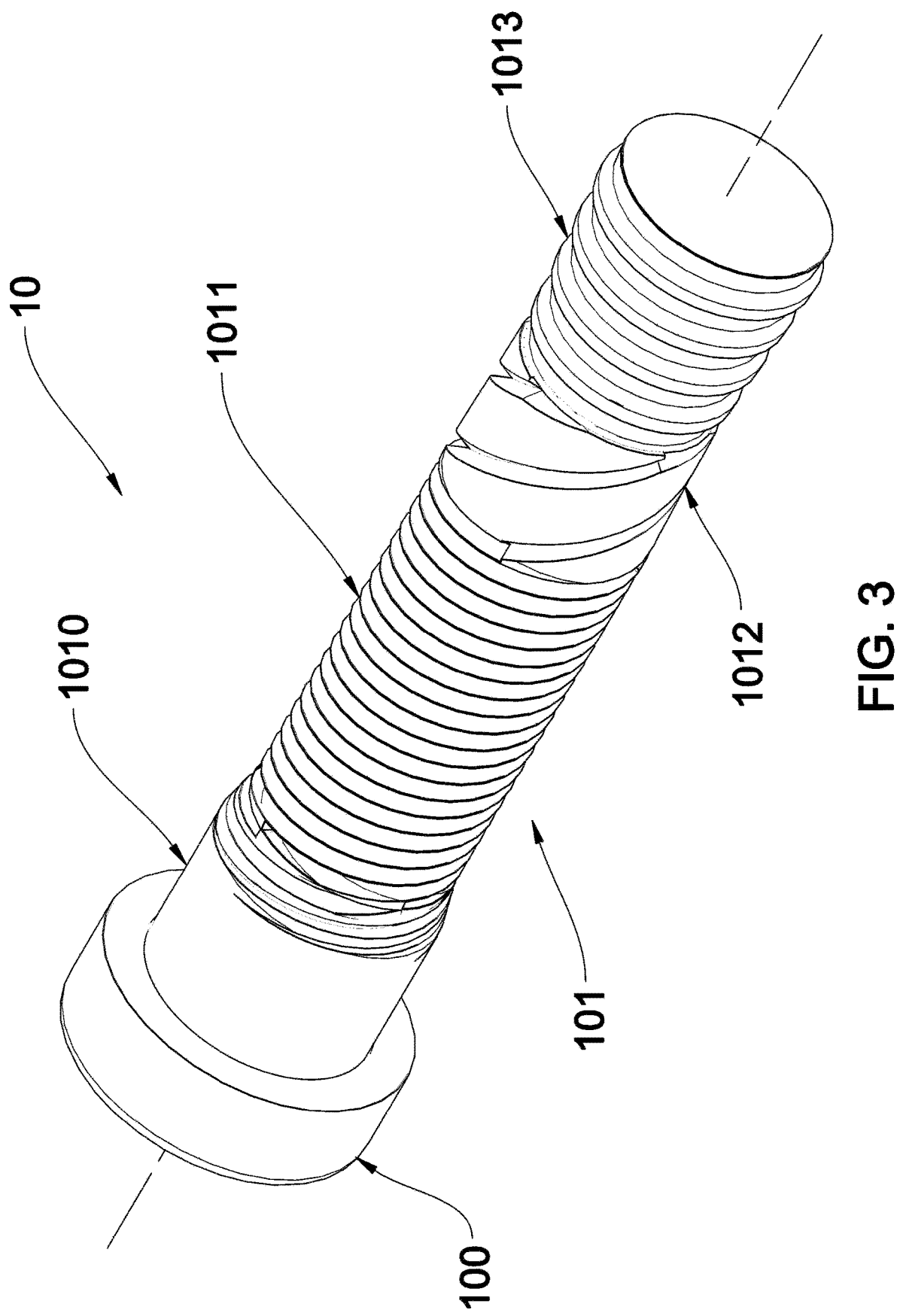
FIG. 3 is a perspective view of a bolt of a threaded fastener according to the invention.
Figure 4:
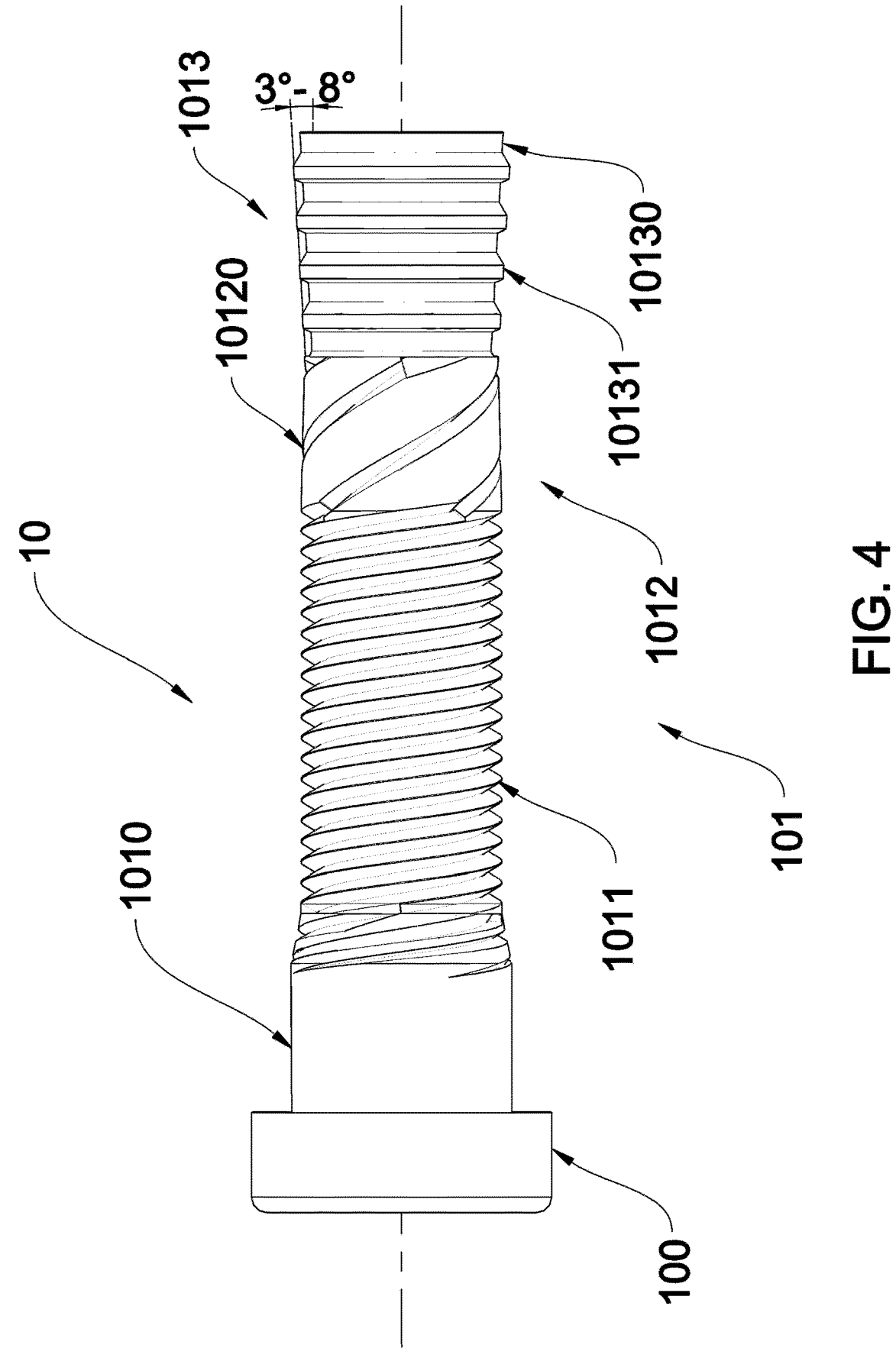
FIG. 4 is a side elevation of the bolt in FIG. 3.
Figure 5:
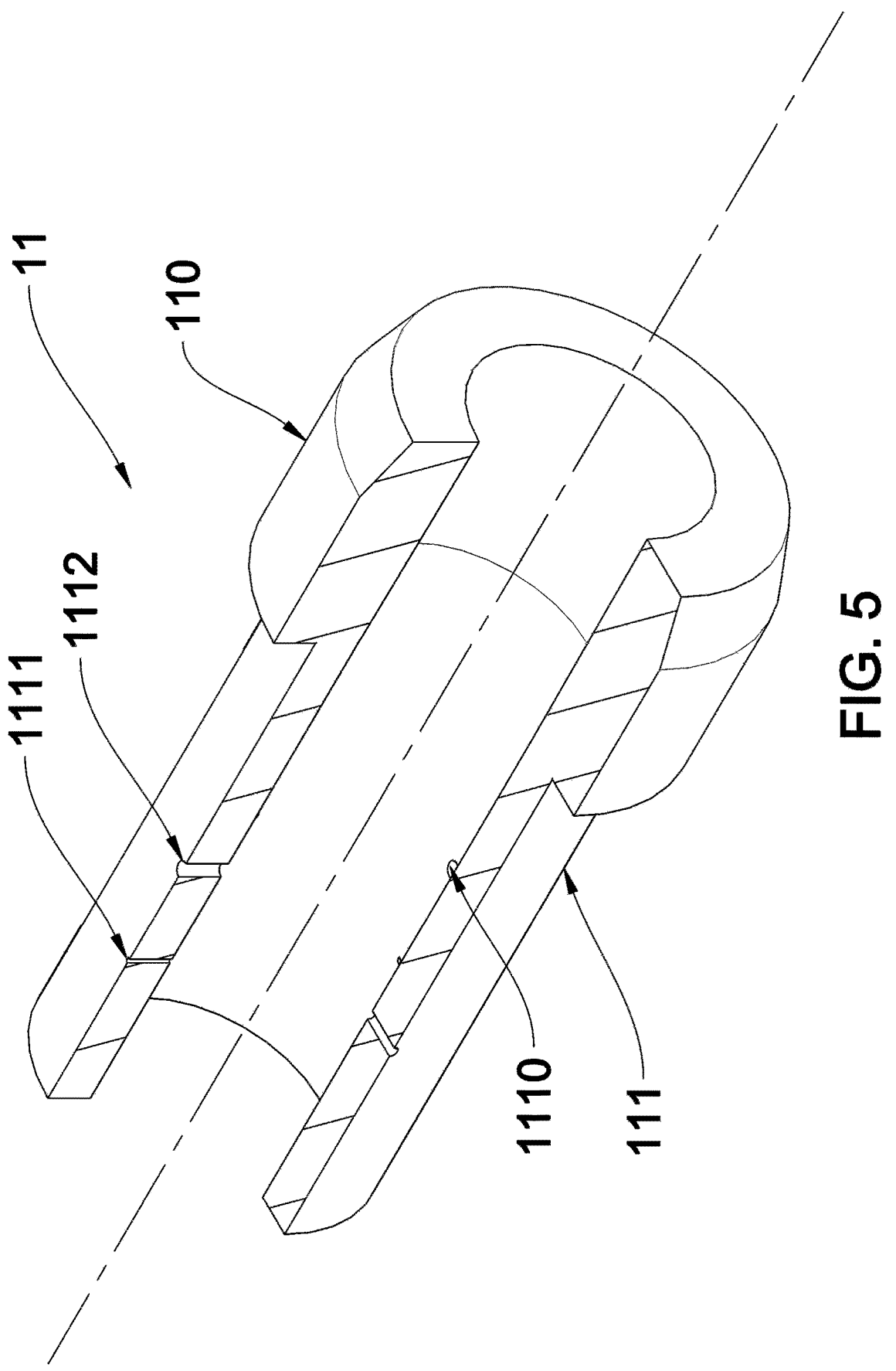
FIG. 5 is a partially broken away view of a hollow member of the threaded fastener according to the invention.
Figure 6:
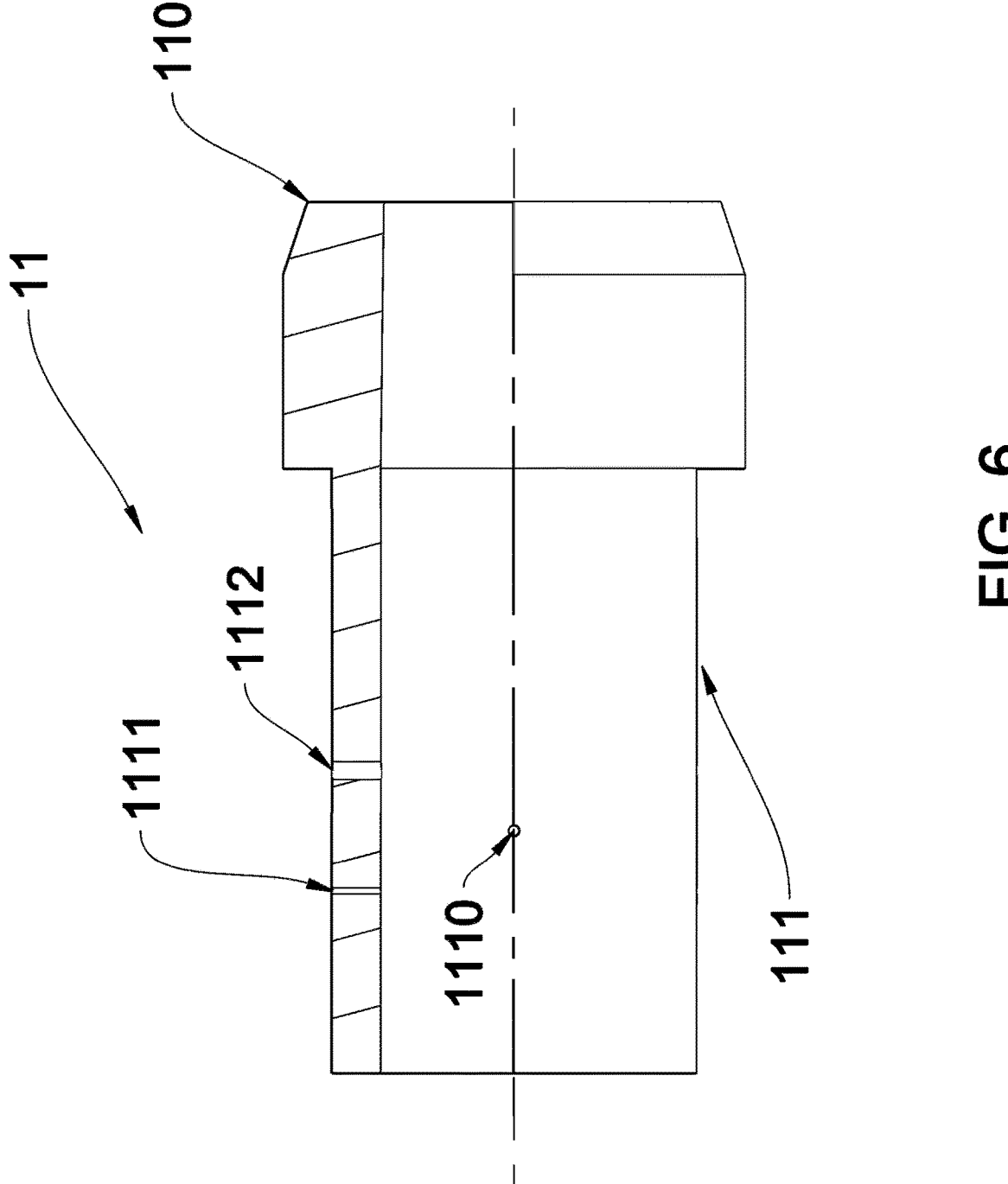
FIG. 6 is a side elevation of the hollow member in FIG. 5.
Figure 7:
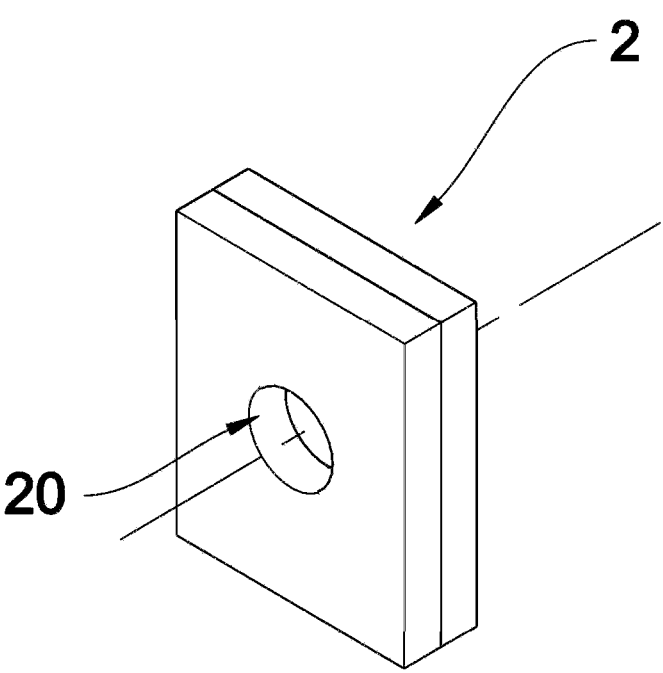
FIG. 7 is a perspective view of a work piece.
Figure 7A:
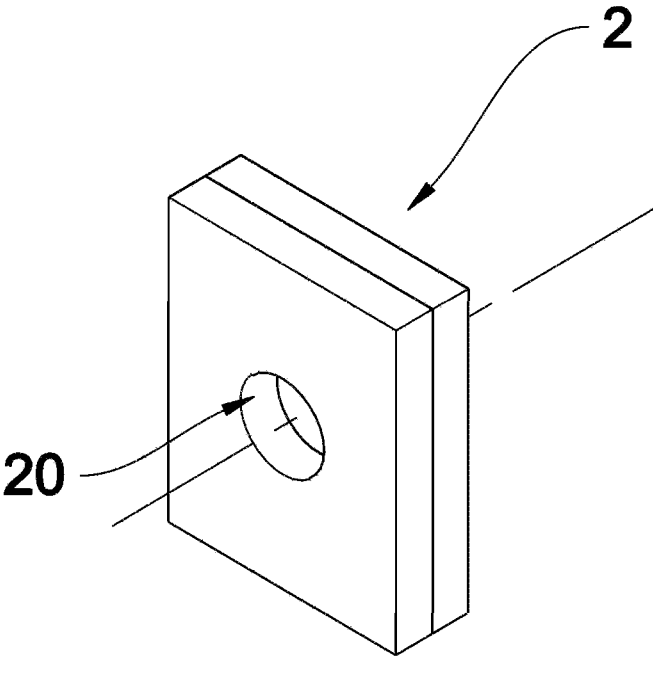
FIG. 7A is another perspective view of the work piece.
Figure 8:
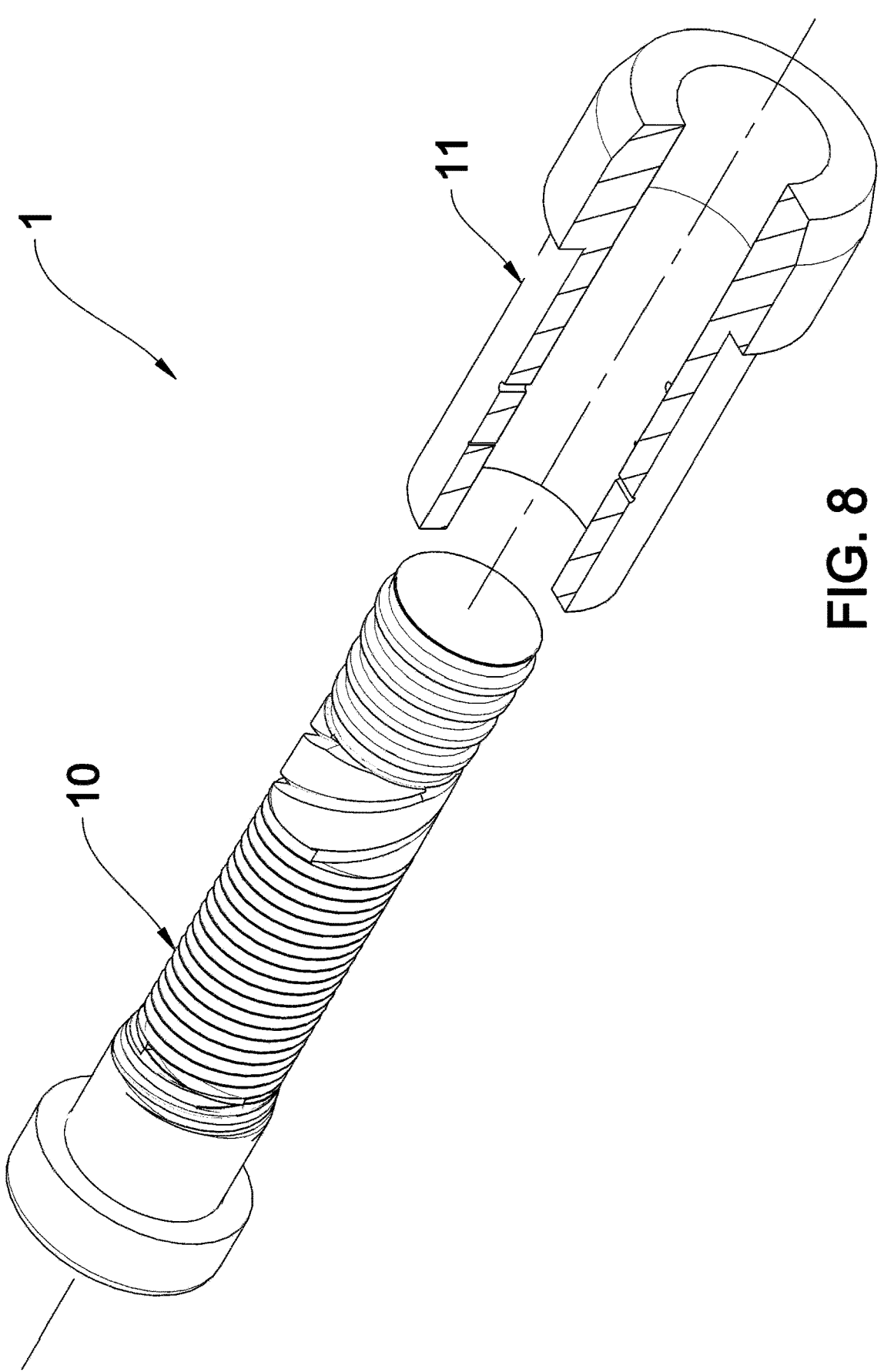
FIG. 8 schematically depicts the bolt and the hollow member of the invention to be assembled.
Figure 9:
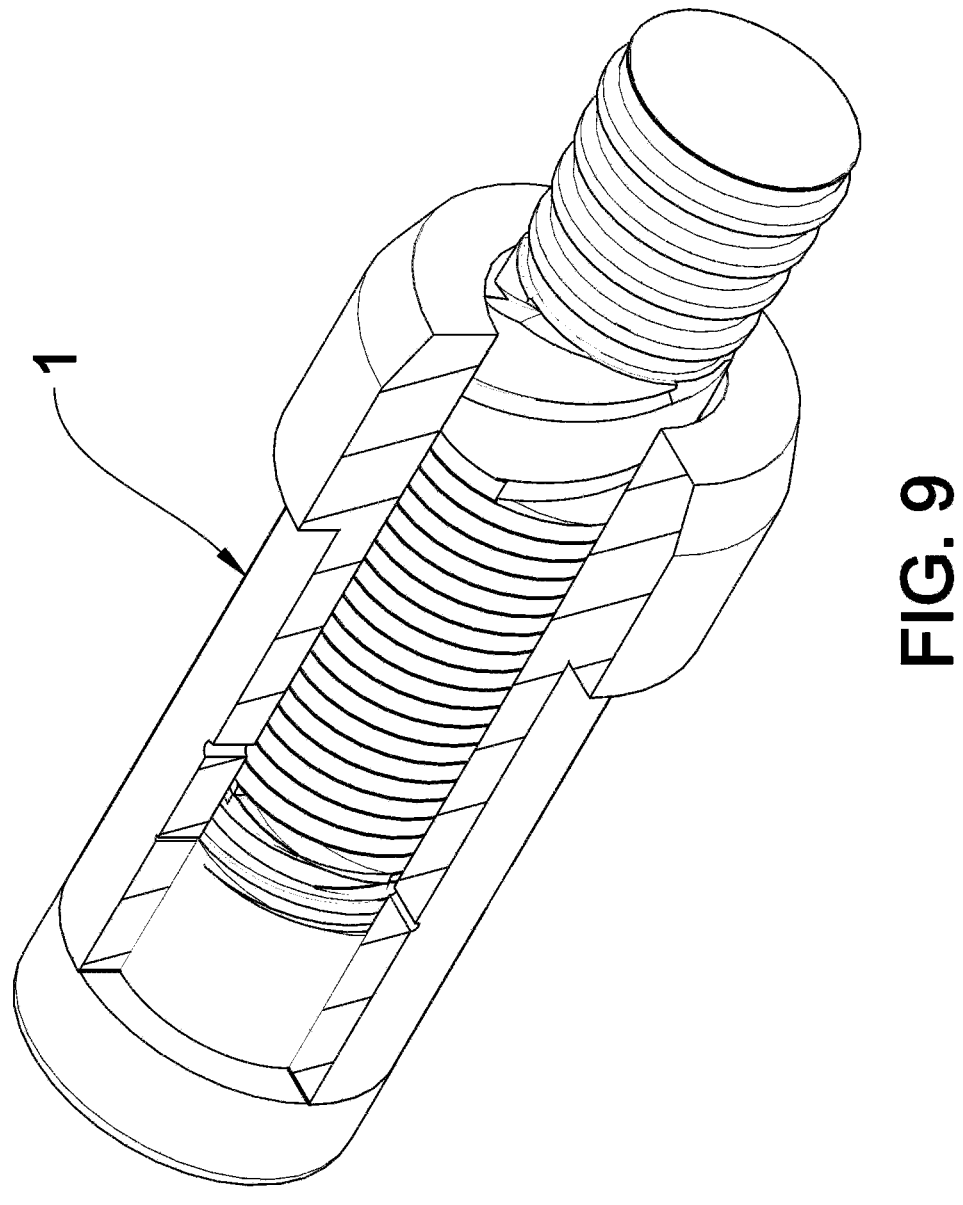
FIG. 9 is a partially broken away view of the bolt and the hollow member of the invention being assembled.
Figure 10:
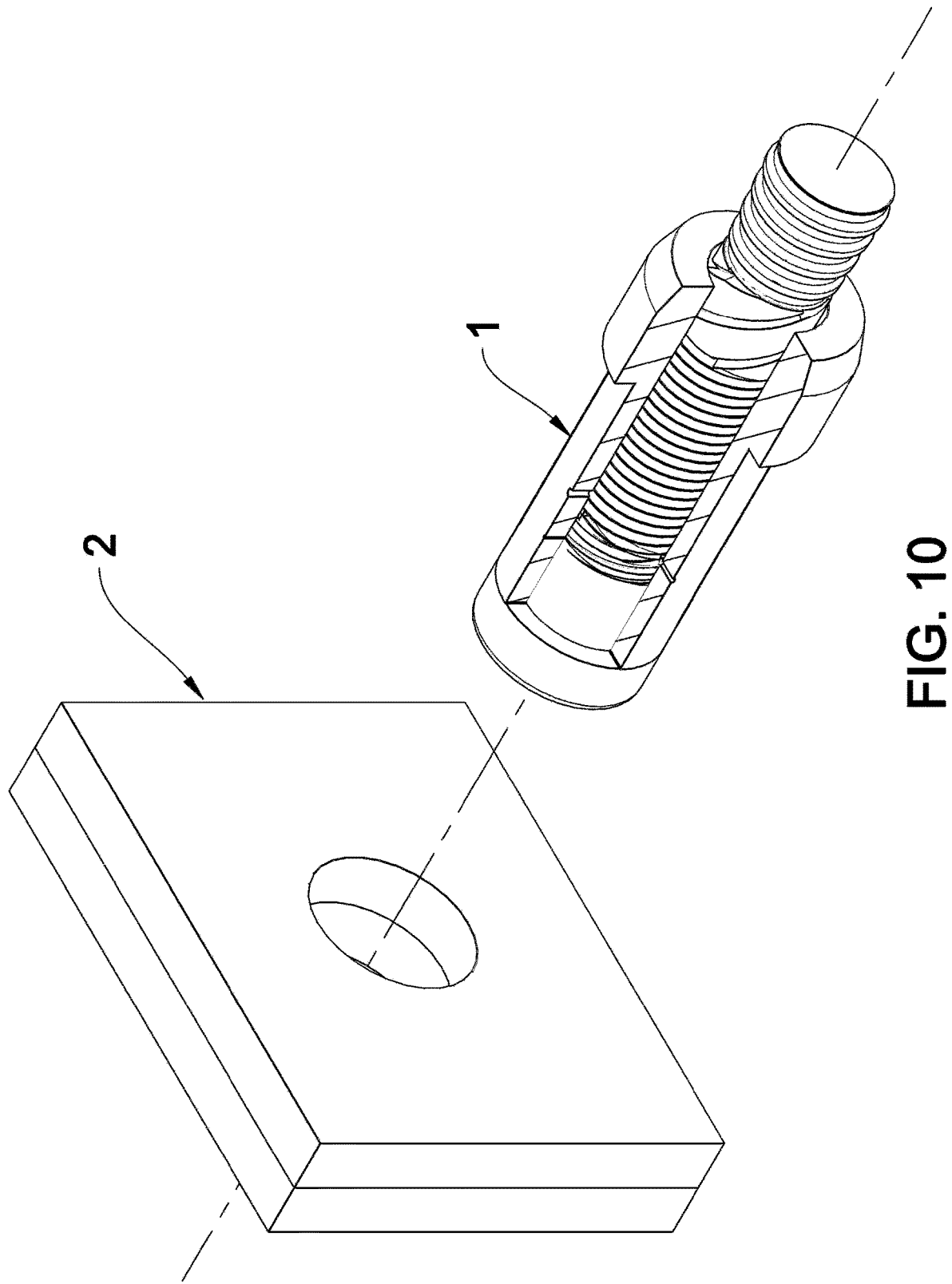
FIG. 10 is a partially broken away view showing the work piece in a step of being fastened by the bolt and the hollow member of the invention.
Figure 11:
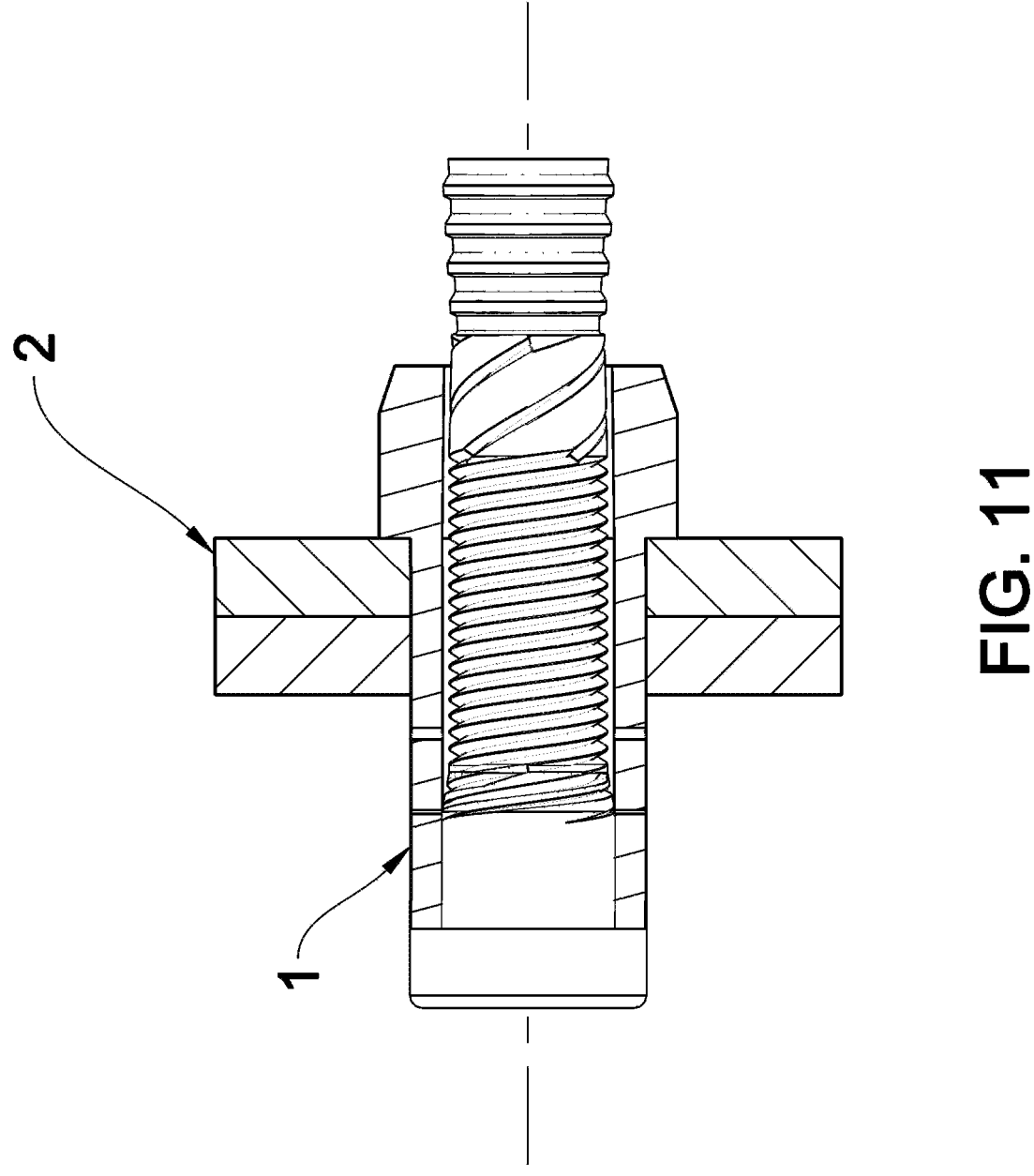
FIG. 11 is a longitudinal sectional view of the work piece positioned by the bolt and the hollow member of the invention.
Figure 12:
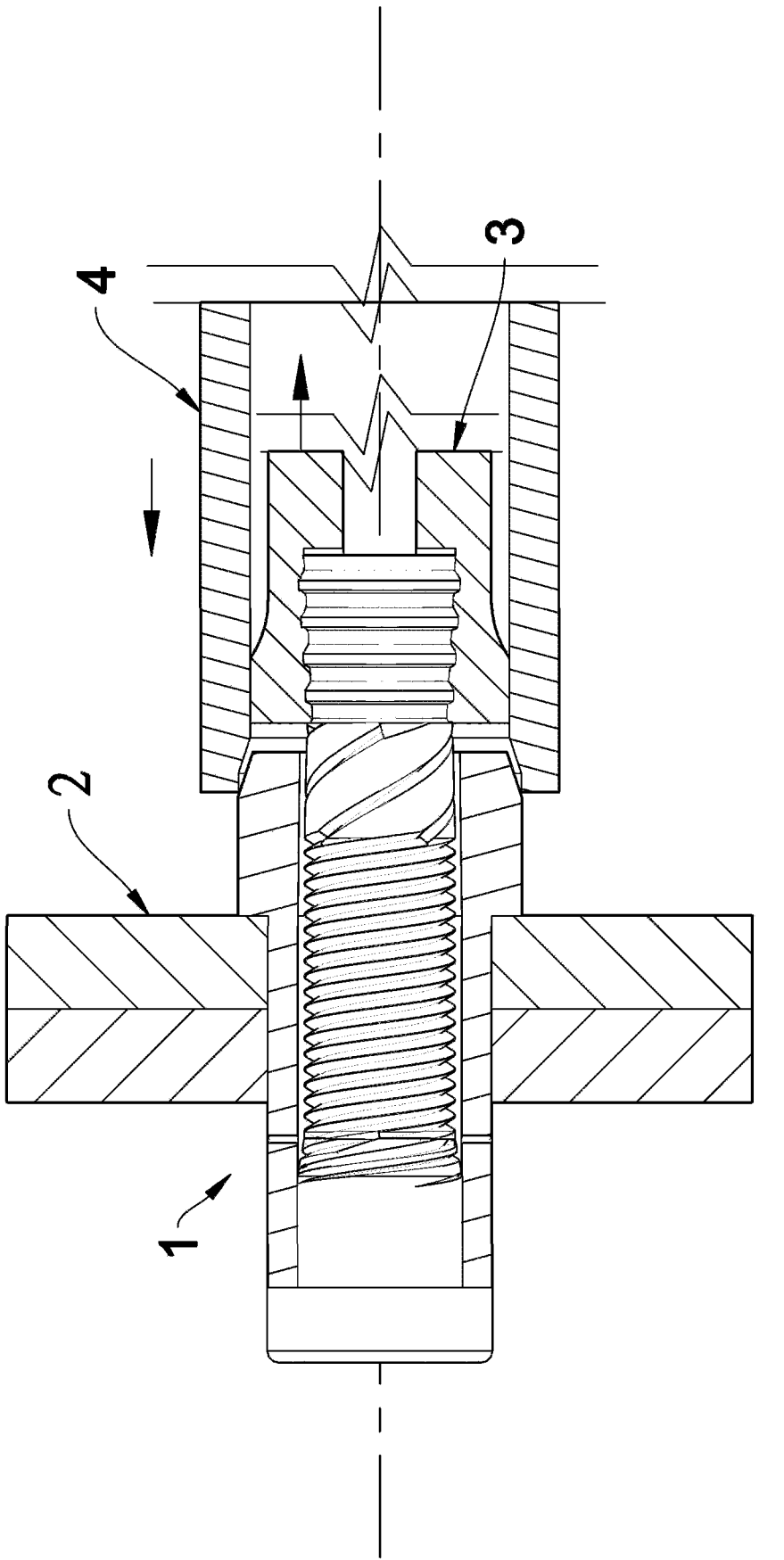
FIG. 12 is a view similar to FIG. 11 showing a fastening element and a sleeve being used for the fastening.
Figure 13:
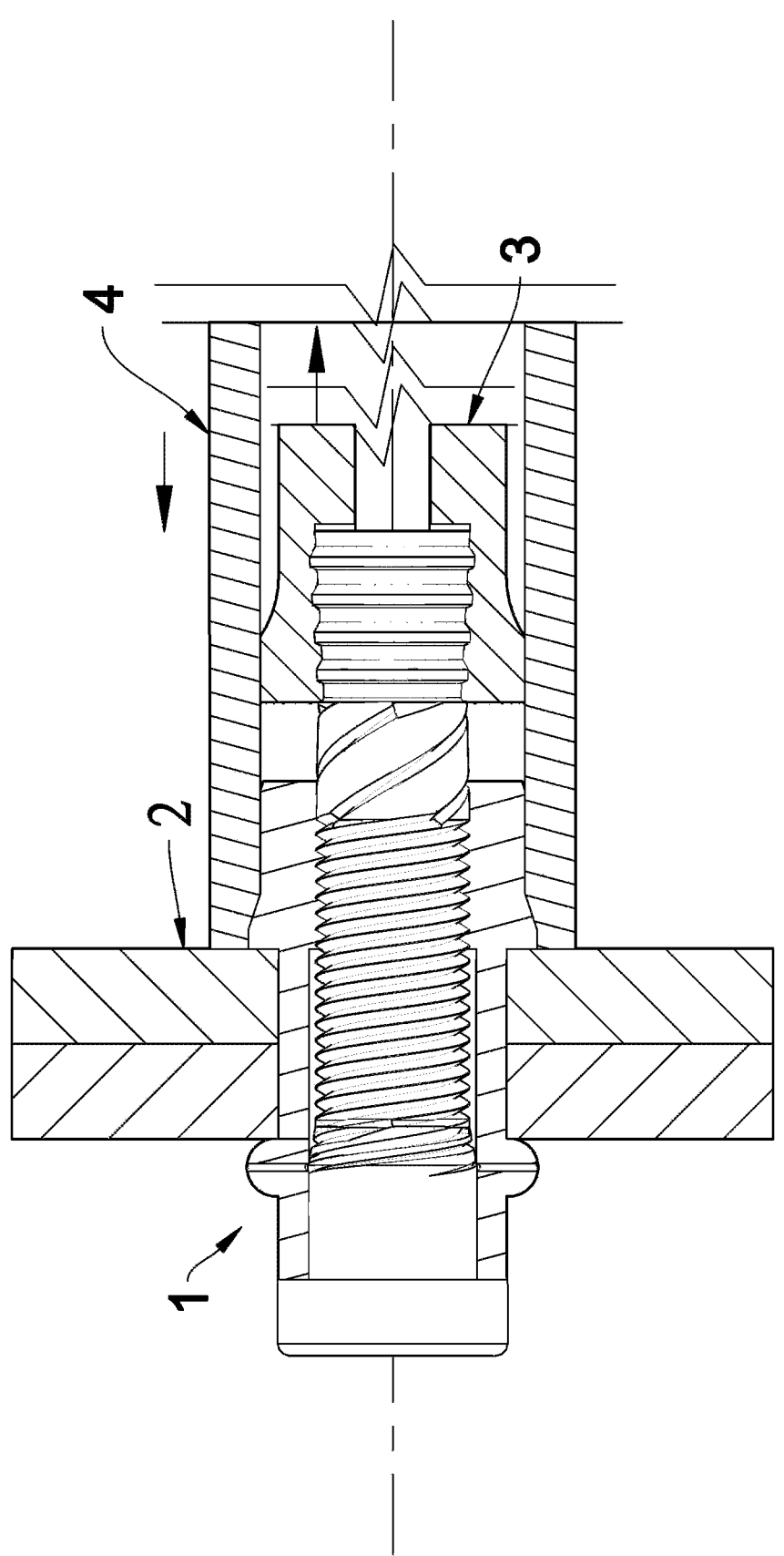
FIG. 13 is a view similar to FIG. 12 showing the malleable shank of the hollow member being pressed to fasten the work piece in cooperation with the fastening element and the sleeve.
Figure 14:
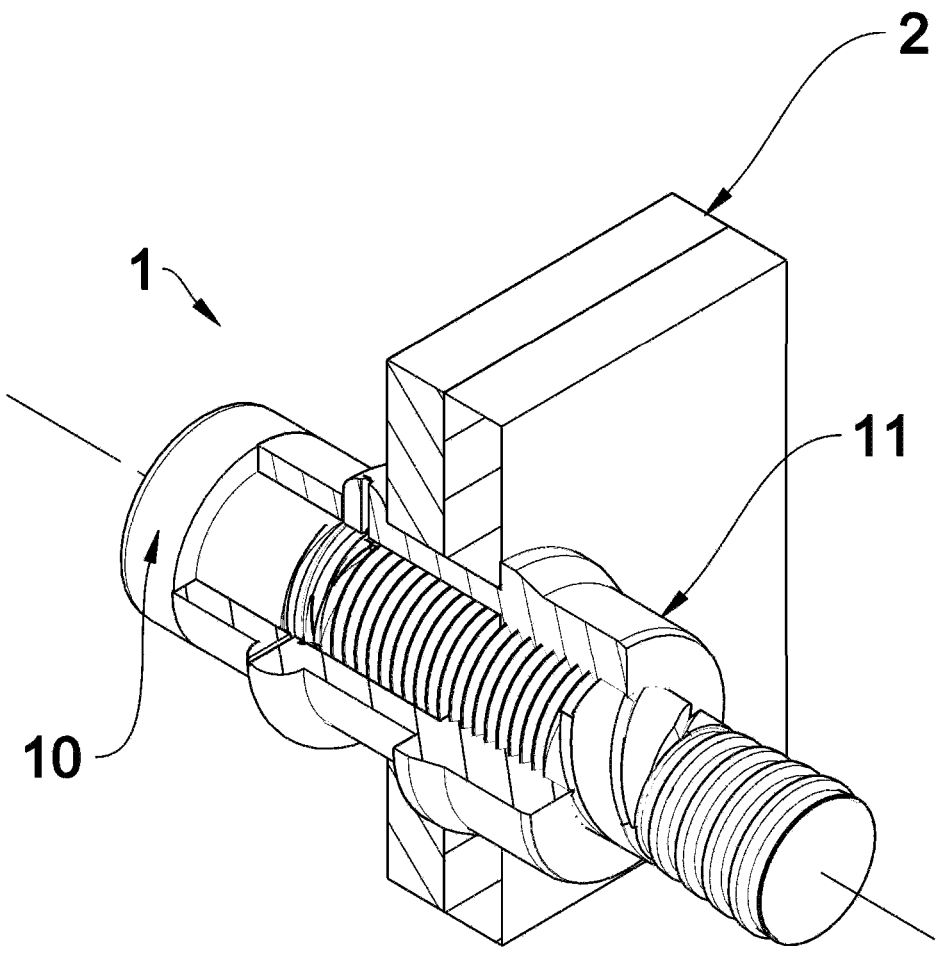
FIG. 14 is a partially broken away view showing the work piece being fastened by the bolt and the hollow member of the invention.

Referring to FIGS. 3 to 14, a threaded fastener 1 in accordance with a first preferred embodiment of the invention comprises a bolt 10 including an enlarged head 100 and a threaded shank 101 including a bare section 1010 proximate the head 100, an end section 1013 having a wider end and having a plurality of alternate grooves 10130 and ridges 10131, an intermediate section 1012 proximate the end section 1013 and having a spiral trough 10120, and a threaded section 1011 between the intermediate section 1012 and the bare section 1010. The end section 1013 is tapered toward the intermediate section 1012 at an angle of 3-degree to 8-degree.

The threaded fastener 1 further comprises a hollow member 11 including an enlarged head 110 and a malleable shank 111 having a plurality of first holes 1110, second holes 1111, and third holes 1112.

This arrangement can increase a fastening force, decrease length, and decrease manufacturing cost of the threaded fastener 1.

In a fastening step (see FIGS. 10 to 14), the hollow member 11 is inserted through a hole 20 of a work piece 2 until the head 110 contacts a front surface of the work piece 2. Next, the bolt 10 is inserted through the hollow member 11 until being stopped by an open end of the hollow member 11. Next, an internally threaded fastening element 3 is secured onto the end section 1013 and a sleeve 4 is disposed on both the head 110 and the fastening element 3 with force. Thus, the malleable shank 111 is pressed. A portion of the malleable shank 111 adjacent the third holes 1112 is raised to urge against a rear surface of the work piece 2. As a result, the work piece 2 is fastened by the threaded fastener 1. It is noted that the provision of the first holes 1110, second holes 1111, and third holes 1112 facilitates the malleability of the shank 111.

The invention has the following advantages and benefits in comparison with the conventional art: length of the bolt 10 is decreased. A variety of work pieces 2 having different thickness can be fastened.

While the invention has been described in terms of preferred embodiments, those skilled in the art will recognize that the invention can be practiced with modifications within the spirit and scope of the appended claims.

What is claimed is:

1. A fastener, comprising;
   a bolt including a head and a threaded shank including a bare section proximate the head, an end section having a plurality of alternate grooves and ridges, an intermediate section proximate the end section and having a spiral trough, and a threaded section between the intermediate section and the bare section; and a hollow member including a head member and a malleable shank having a plurality of holes;

wherein the end section is tapered toward the intermediate section at an angle of 3-degree to 8-degree.

\* \* \* \* \*